(12) United States Patent
Selicato

(10) Patent No.: US 7,928,599 B2
(45) Date of Patent: Apr. 19, 2011

(54) STEERING LOCK HAVING CHIP COMMUNICATING WITH ELECTRONIC SYSTEM OF A MOTOR VEHICLE

(76) Inventor: Pietro Selicato, Conversano (IT)

( * ) Notice: Subject to any disclaimer, the term of this patent is extended or adjusted under 35 U.S.C. 154(b) by 238 days.

(21) Appl. No.: 12/092,366

(22) PCT Filed: Aug. 10, 2006

(86) PCT No.: PCT/IB2006/002222
§ 371 (c)(1),
(2), (4) Date: Aug. 11, 2008

(87) PCT Pub. No.: WO2007/052097
PCT Pub. Date: May 10, 2007

(65) Prior Publication Data
US 2008/0289375 A1    Nov. 27, 2008

(30) Foreign Application Priority Data

Nov. 3, 2005  (IT) .............................. BA2005A0038

(51) Int. Cl.
*B60R 25/02* (2006.01)
(52) U.S. Cl. ....................................... 307/10.2; 307/10.5
(58) Field of Classification Search .................. 307/10.2, 307/10.5
See application file for complete search history.

(56) References Cited

U.S. PATENT DOCUMENTS 5,671,621 A * 9/1997 Watanuki et al. ............ 70/278.3
6,816,059 B2 * 11/2004 Yanaka ........................ 340/5.72

* cited by examiner

*Primary Examiner* — Jared J Fureman
*Assistant Examiner* — Hal I Kaplan
(74) *Attorney, Agent, or Firm* — Egbert Law Offices PLLC

(57) ABSTRACT

Present invention relates to an electro-mechanical anti-theft device suitable both to inhibit rotation of the steering axis of a motor vehicle and to interrupt feeding of necessary electric switchboards for correct operation of the same motor vehicle. As to this latter object of the invention, a signal originating from a chip, housed inside a protected cylinder, can be coded by a suitable switchboard, only when the steering lock device is disconnected.

2 Claims, 4 Drawing Sheets

STEERING LOCK HAVING CHIP COMMUNICATING WITH ELECTRONIC SYSTEM OF A MOTOR VEHICLE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an electro-mechanical anti-theft devices that are suitable for both inhibiting rotation of the steering column of a motor vehicle and for interrupting the operation of the electric system of a motor vehicle. In particular, the present invention relates to anti-theft devices that include chips for the purpose of identifying a proper coded key when inserted into the key-type ignition system of a vehicle.

2. Description of Related Art Including Information Disclosed Under 37 CFR 1.97 and 37 CFR 1.98.

Anti-theft devices are known in the prior art. One type of anti-theft device locks the rotation of the steering column of a vehicle through the action of a piston pin. When a proper key is inserted into the key-type ignition system, the steering column is unlocked so that the rotation of the steering column in a proper manner can be achieved. When the proper key is applied and the steering column is unlocked, the vehicle can be operated. These steering column locking systems can also be provided with a variety of other functions. These are often assembled as standard items in motor vehicles.

The conventional steering column locking device also carries out another function. This function is the ability to allow for the ignition of the engine of the motor vehicle.

These functions are driven by only one mechanical key, that when removed, starts a mechanical device that displaces a ratchet that engages a grooved bushing. The bushing is connected with the steering column. The bushing also starts rotation of a key device so as to switch off the ignition contact of the main key.

More elaborate steering column locking devices also can include a transponder in the mechanical key. The transponder is capable of communicating with a processor whose function is to either allow or not allow motor ignition. This serves to protect the motor vehicle from unauthorized use.

There are also a series of steering column locking devices which are designed to solve problems that are associated with the fragility of the key and the lock. These can also be assembled as a standard item by the manufacturer. These steering column locking devices also provide the locking of the steering column by means of an introduction of a padlock that is provided with a piston pin. These types are formed of steel and are very resistant to breaking. These steering locking devices also provide a microswitch which can interrupt the contact set-up by the key during ignition. As a result, vehicle ignition is prevented when an improper key is used and a theft is attempted.

Standard steering locking devices have a variety of problems. First, they are relatively small and can often break. The housings that are used to contain the device are generally formed of easily breakable materials, such as aluminum alloys or polymeric materials.

Certain steering column locking devices utilize a transponder locates within the key. The operation of to the transponder can be avoided by a theft when the thief breaks into the motor housing of the vehicle. The thief can substitute a controlled electronic processor in order to allow for the starting the motor. By cutting or removing the cylinder associated with the steering column locking device, it is possible to disconnect the locking piston pin so as to allow the steering column to rotate in a desired manner. The microswitch within such devices only serves to interrupt the supply of the electrical energy to the motor vehicle. It is possible to short-circuit cables downstream of this micro-switch in order to allow for the starting of the vehicle.

BRIEF SUMMARY OF THE INVENTION

The present invention provides an anti-theft device for motor vehicles which provides additional resistance to theft. The present invention utilizes a Dallas-type chip that can communicate by serial I-Wire Net™ protocol. As such, it is possible to manage input signals of the processor of the vehicle.

The present invention therefore supplies an anti-theft device that is suitable for preventing the operation of the electronic system of the motor vehicle. In the event of total or partial removal of the protective cylinder, the present invention still inhibits the operation of the motor vehicle electronics. Additionally, the present invention also prevents the operation of a motor vehicle electronics in the event of the removal of the steering lock device and the chip.

In the present invention, the chip is utilized within the steering lock device. As such, it is protected effectively without the use of additional protective containers.

The present invention does not interfere with the other electronic devices that are assembled as standard within motor vehicles. As such, it allows for the proper functioning of the electronic system of the motor vehicle without major modifications.

DETAILED DESCRIPTION OF THE INVENTION

Figure 1:
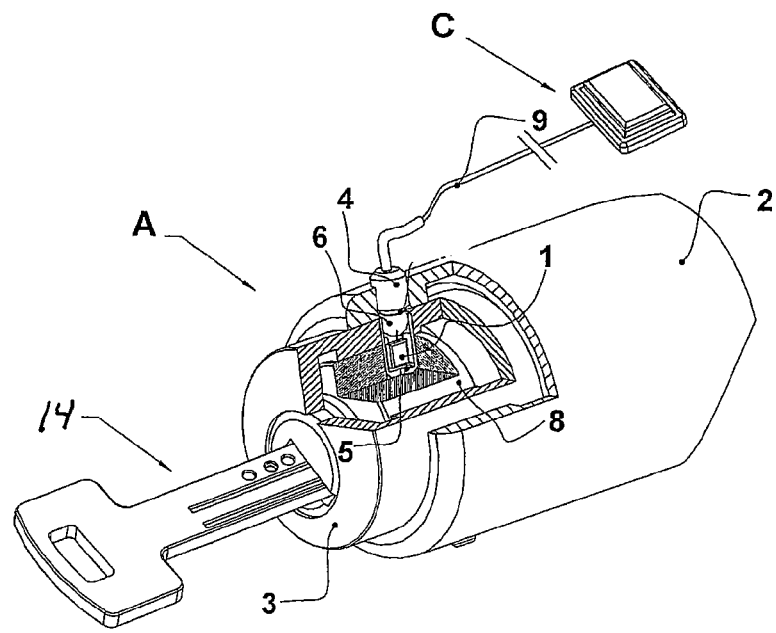
FIG. 1 is a perspective view of the device of the present invention with a cut-out portion, showing the state in which the anti-theft apparatus of the present invention is disconnected.
Figure 2:
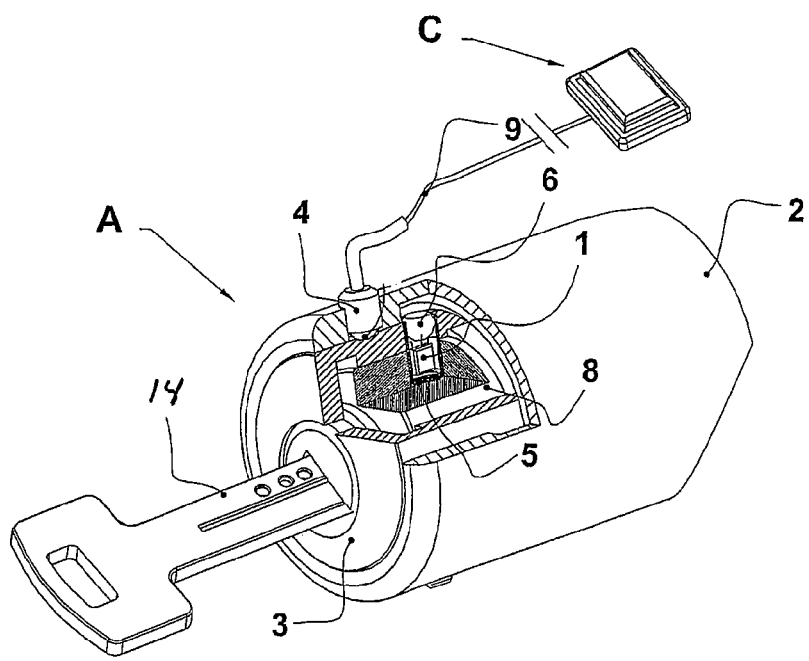
FIG. 2 is a perspective view of the anti-theft apparatus of the present invention, in a partial cut away view, showing the anti-theft apparatus as being connected.
Figure 3:
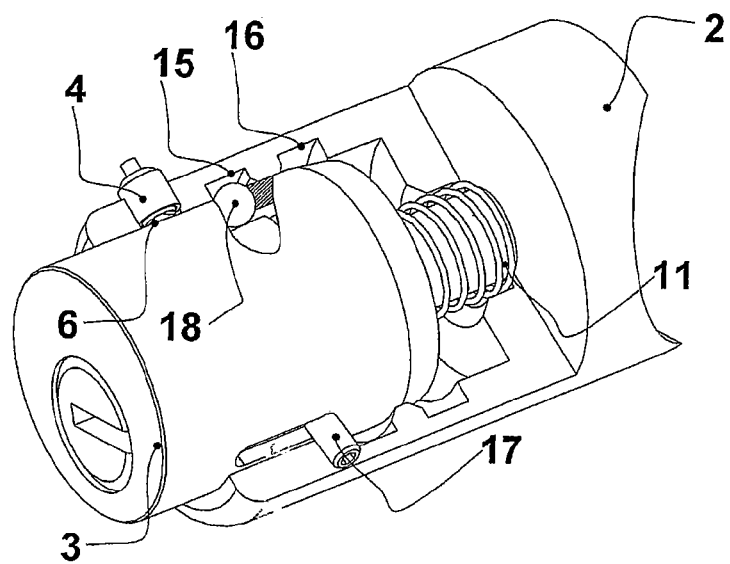
FIG. 3 is a partial perspective view of the present invention showing the contact alignment arrangement of the chip that is achieved through the axial movement of the movable body.
Figure 4:
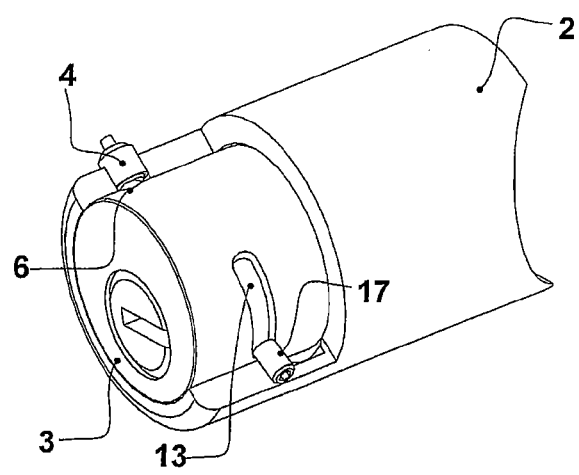
FIG. 4 is a partial perspective view of the present invention showing the alignment of contacts that are achieved by the rotation of the movable body.

The anti-theft apparatus of the present invention is formed of an electromechanical anti-theft device including a steering column locking device A in which a chip 1 is housed. The chip has the ability to connect with the processor C so as to carry out the operation of the vehicle. The chip 1 effectively determines whether the code on the mechanical key 14 is accurate so as to cause the processor to approve the connection in order to activate the electronic system of the vehicle.

The present invention is formed of a fixed protective body 2 connected to the housing of the steering column. The body 2 can be connected to the housing of the steering column by soldering. The fixed protective body 2 houses a moving body 3 therein. A chip 1 is positioned within the moving body 3 in order to effectively protective the chip 1. In the preferred embodiment of the present invention, both the fixed body 2 and the moving body 3 are of a cylindrical shape. As such, they can effectively serve to lock the steering column of the motor vehicle. The moving body 3 is provided with a small piston 11 at its end. This can be connected to a conventional bushing that is connected to and co-axial with the steering column.

There is a mechanical contact 4 that is utilized for the purpose of detecting the code of the chip 1. The mechanical contact 4 is housed in a radial manner within the fixed body 2. When contact is established, the code of the chip 1 is delivered to the processor C by means of a connecting line 9.

In the preferred embodiment of the present invention, in order to connect the moving body 3 to the fixed body 2, a pair of annular seats 15 and 16 are formed on an inside surface of the fixed body 2. The annular seats 15 and 16 are in spaced relationship to each other. The seat 16 is the resting position for the moving body 3. The other seat 15 is arranged so as to stop the connected steering lock.

The mechanical stop of the moving body 3 and the fixed body 2 utilizes one or more balls 18 that are housed in the moving body 3. These are arranged in order to be received into the annular seats 15 and 16 of the fixed body 2. The balls 18 are, in turn, reaction driven by the device driven by the lock 8 associated with the mechanical key 14.

The axial range of the moving body 3 is defined by a screw 17 introduced into the fixed body 2. The screw 17 has an end that is received within a slot 13 formed on an exterior surface of the moving body 3.

The miniature chip 1, in the preferred embodiment of the present invention, is housed within a cylindrical opening on the moving body. In particular, a small cylindrical member 5 is threaded on the exterior surface thereof and is closed at its upper end by conducting tip 6. The moving body 3 carries the cylindrical body 3, along with the chip 1, during the rotation of the moving body.

In order to lock the steering column and to inhibit the operation of the processor C, it is necessary to cause the moving body 3 to displace axially along the fixed body 2. The key 14 is inserted into the key slot associated with the moving body 3 so as to move from a stop position to a rotatably displaced position. The displacement of the moving body 3 will cause displacement of the contact 5 with the chip 1 connected thereto. This causes an interruption of the circuit which connects to the processor C.

The chip 1 is connected by means of the respective contacts to the tip 6 and to the surface of the threaded body 5. The tip 6 is electrically insulated from the moving body 3. The tip 6 is also electrically insulated from the threaded body 5.

Figure 5:
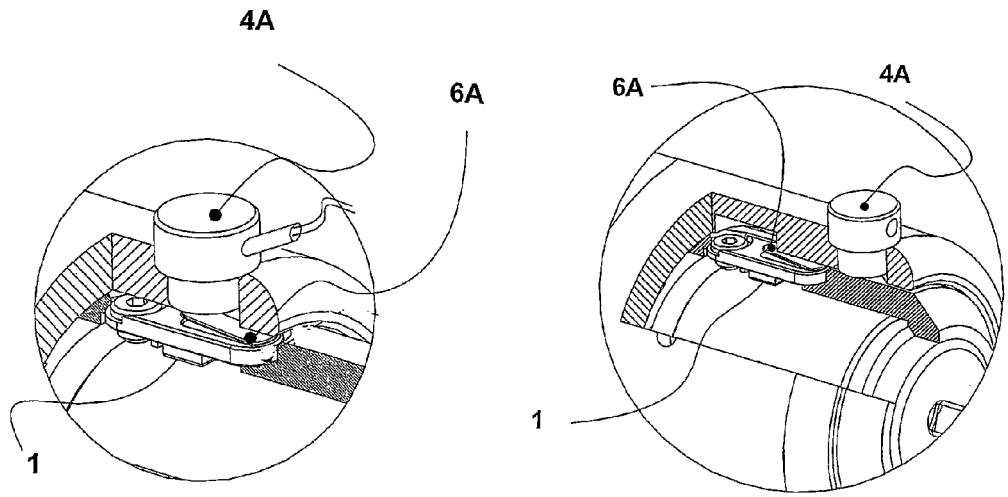
FIG. 5A is a detailed perspective view of a further embodiment of the present invention in which a proper contact is achieved through the use of a small flexible tongue when the circuit is closed.
FIG. 5B is another perspective view of alternative embodiment of FIG. 5A showing the arrangement with an open circuit contact.
Figure 6:
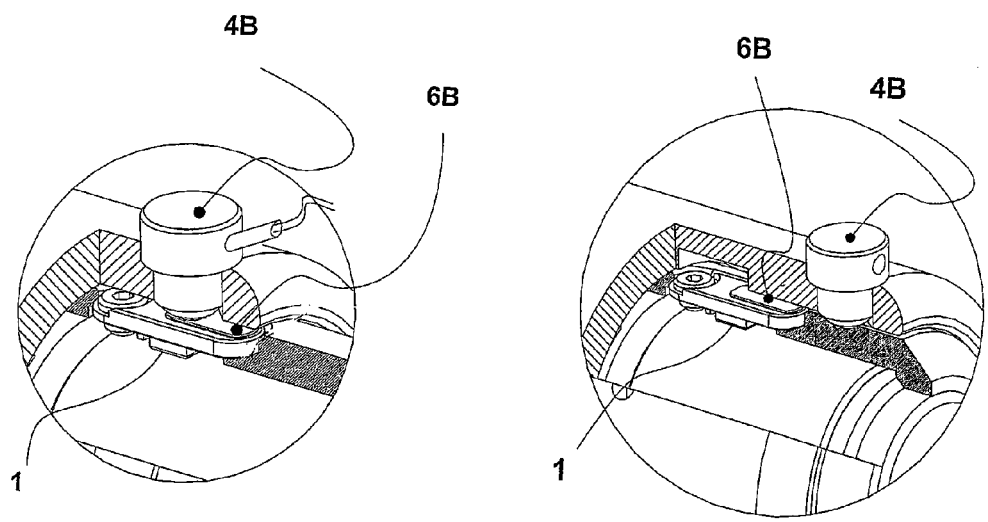
FIG. 6A is a detailed perspective view of still a further embodiment of the present invention and showing, in particular, the connections of the contacts as carried out by a small fixed tongue when the circuit is closed.
FIG. 6B is a detailed perspective view of the alternative embodiment of FIG. 6A showing the embodiment with an open circuit.

With reference to FIG. 5, the reading of the code of chip 1 is carried out by means of a mechanical contact having a small mechanical tongue 6a slightly taken up with a reference point of support. When the anti-theft device is disconnected, the small tongue 6a will contact the tip and close the circuit. The reading of the chip 1 code can also be done by means of an additional type of contact in which a metal foil 6b is fixed. The tip 4b is controlled by reaction with a spring. This arrangement is shown in FIG. 6.

Figure 7:
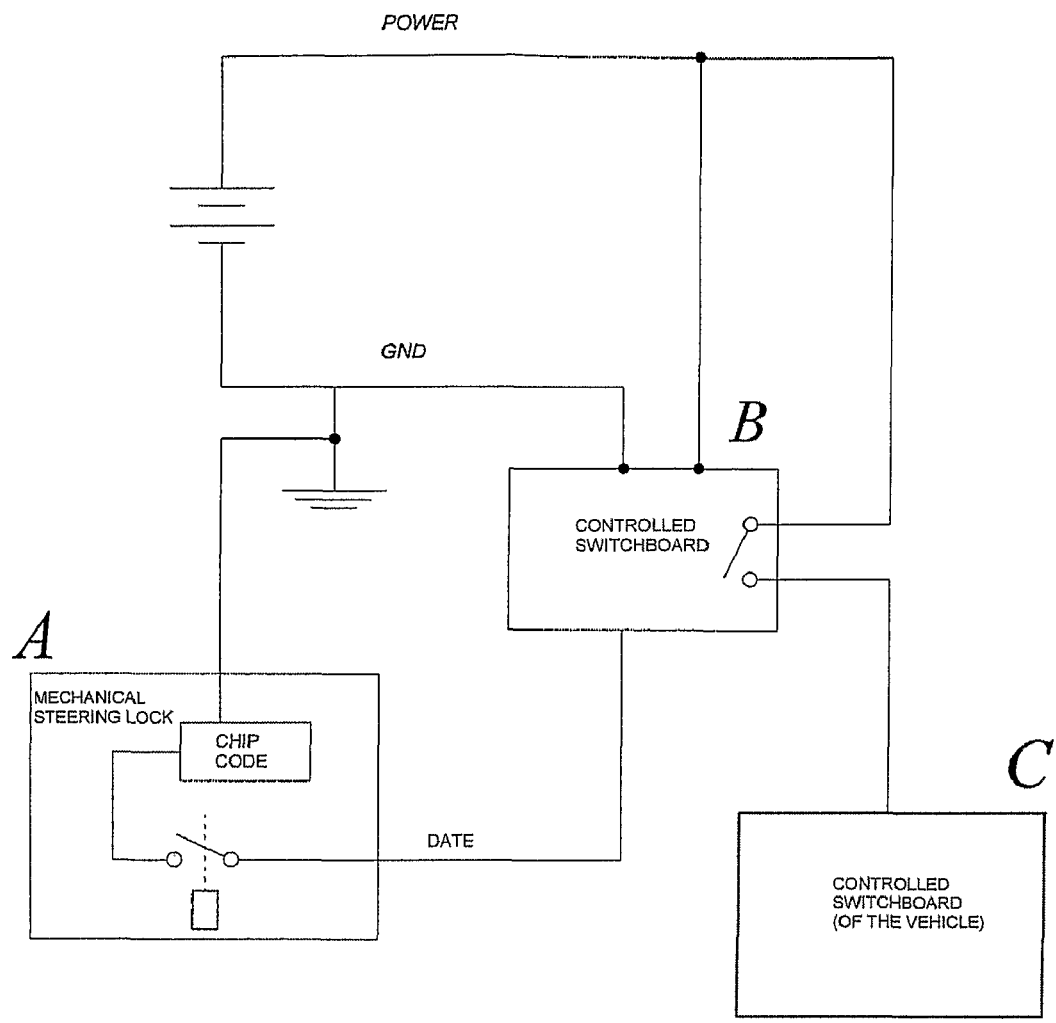
FIG. 7 is a block diagram showing how the present invention operates through the use of a processor with the electronic system of the vehicle.

In FIG. 7, a signal coming from chip 1 is coded by an intermediate processor B that decodes the signal. If the decoded signal is positive, it will supply the processor C controlled by the vehicle motor with an electrical supply so as to allow for the ignition of the motor vehicle.

In the event that the protected fixed body 2 is cut or removed, it is no longer possible to carry out a reading of a code of chip 1. As a result, processor C will not be operable so as to supply the electrical energy to the electronic system of the motor vehicle. As such, theft is effectively prevented.

I claim:

1. An anti-theft apparatus for controllably mechanically locking a rotation of a column of a steering wheel and for controllably operating an electronic system of a motor vehicle, the anti-theft apparatus comprising:

a fixed body suitable for connection to the column of the steering wheel, said fixed body having an interior opening, said fixed body having an electrical contact facing said interior opening, said electrical contact having a wire extending therefrom;

a movable body axially and rotationally displaceable within said interior opening of said fixed body, said movable body having an electrical contact formed on an outer surface thereof adjacent said fixed body, said movable body having a key slot formed therein;

a chip positioned within said movable body and electrically connected to said electrical contact of said movable body;

a key insertable into said key slot of said movable body, said key having a code embedded therein, said chip for sensing said code of said key, said key for causing said movable body to move axially and rotationally relative to said fixed body so as to release the mechanical lock of the column of the steering wheel; and a processor connected to said wire of said contact of said fixed body, said processor suitable for connection to the electronic system, said chip transmitting a signal to said processor when said code of said key is acceptable and when said contact of said movable body electrically connects with said contact of said fixed body.

2. The anti-theft apparatus of claim 1, said movable body being a cylinder, said contact of said movable body being a tip extending to said outer surface, said tip being electrically isolated from said movable body, said contact of said fixed body being a tip extending radially to said interior opening and adjacent said outer surface of said movable body, said wire being connected to said tip of said contact of said fixed body.

* * * * *